United States Patent [19]

Pentecost

[11] Patent Number: 5,217,800

[45] Date of Patent: Jun. 8, 1993

[54] SHAPED PART OF INJECTED OR EXTRUDED PLASTIC WASTE

[75] Inventor: Mark A. J. Pentecost, Micheldorf, Austria

[73] Assignee: Schaumstoffwerk Greiner Gesellschaft m.b.H., Kremsmünster, Austria

[21] Appl. No.: 690,990

[22] PCT Filed: Dec. 6, 1989

[86] PCT No.: PCT/AT89/00117
§ 371 Date: Jun. 5, 1991
§ 102(e) Date: Jun. 5, 1991

[87] PCT Pub. No.: WO90/06218
PCT Pub. Date: Jun. 14, 1990

[30] Foreign Application Priority Data

Dec. 6, 1988 [AT] Austria .................. 2992/88

[51] Int. Cl.⁵ .................................. B32B 5/16
[52] U.S. Cl. ............................ 428/283; 264/176.1;
264/177.2; 264/257; 264/330; 428/224;
428/105; 428/114; 428/317.9
[58] Field of Search ............ 428/105, 114, 283, 317.9;
264/176.1, 177.2, 257, 330

[56] References Cited

U.S. PATENT DOCUMENTS 3,806,562  4/1974  Lamort et al. ............... 264/31
3,864,193  2/1975  Frierson et al. ............. 264/176

FOREIGN PATENT DOCUMENTS 0062957  10/1982  European Pat. Off. .
3315088  10/1984  Fed. Rep. of Germany .
3544417   8/1986  Fed. Rep. of Germany .
1521720   8/1978  United Kingdom .

Primary Examiner—James J. Bell
Attorney, Agent, or Firm—Collard & Roe

[57] ABSTRACT

A shaped part comprises a body of plastic material, more than 50% of the volume of the shaped part consisting of plastic waste particles and particles of impurity distributed therethrough and embedded therein. The plastic waste particles have a flow point or more than 80° C. and a length of less than 6 mm, up to 70% of the volume of the shaped part comprising plastic waste particles having a flow point exceeding the maximum processing temperature of the plastic material of the body. A portion of the plastic waste particles have a wall thickness of more than 0.5 mm and the remaining portion thereof has a wall thickness of less than 0.5 mm. Particles of the plastic material, plastic waste and impurities are mixed, the plastic material particles are plasticized at a processing temperature of 150° C. to 210° C. while the mixture is subjected to a spiral movement and the pressure is increased to obtain a melt, of the plastic material wherein the plastic waste and impurities are substantially uniformly distributed and embedded, and the melt is shaped.

31 Claims, 7 Drawing Sheets

U.S. Patent June 8, 1993 Sheet 3 of 7 5,217,800
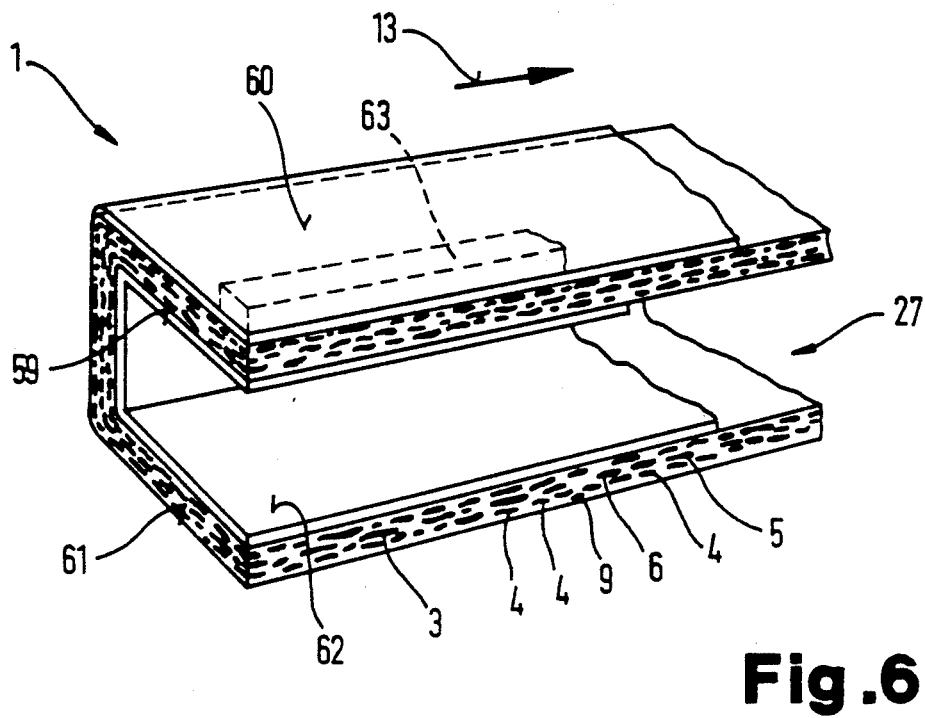
Fig.6
Fig.10
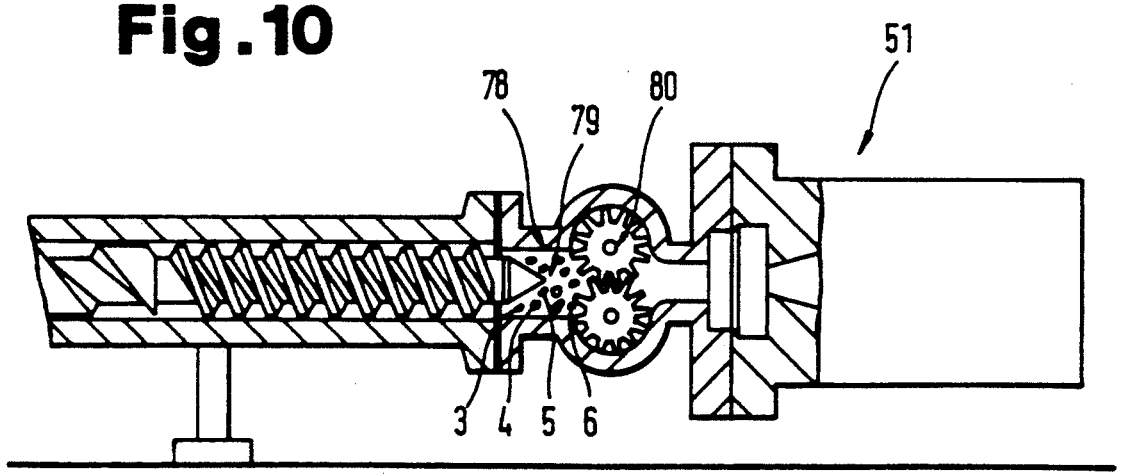

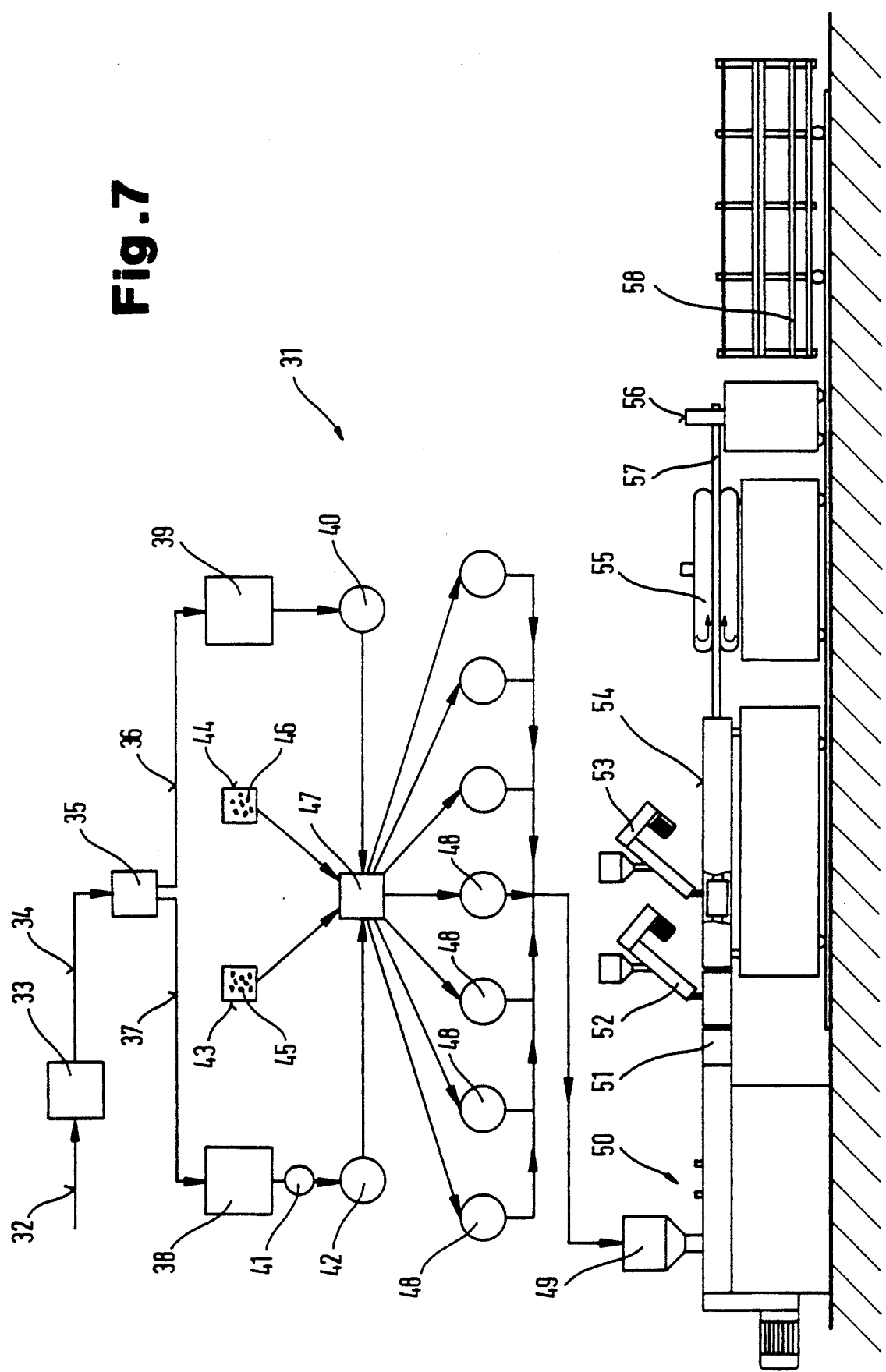

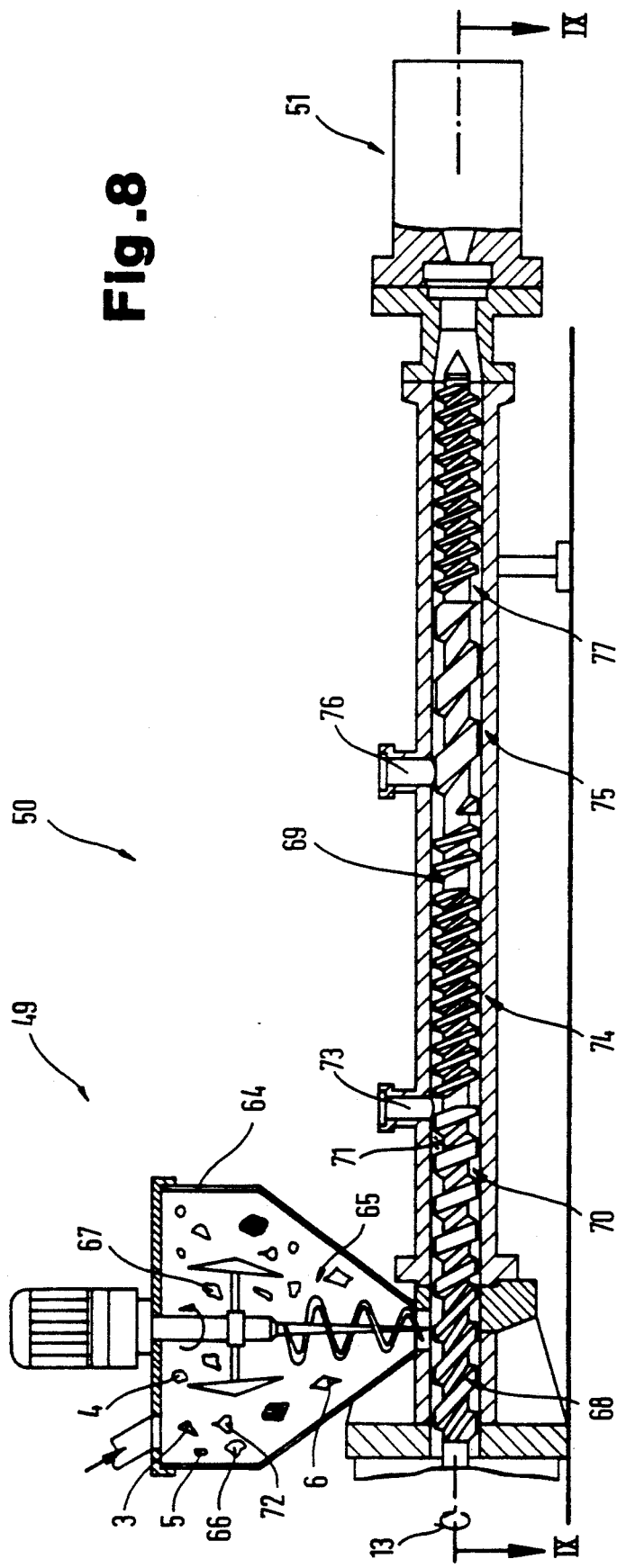
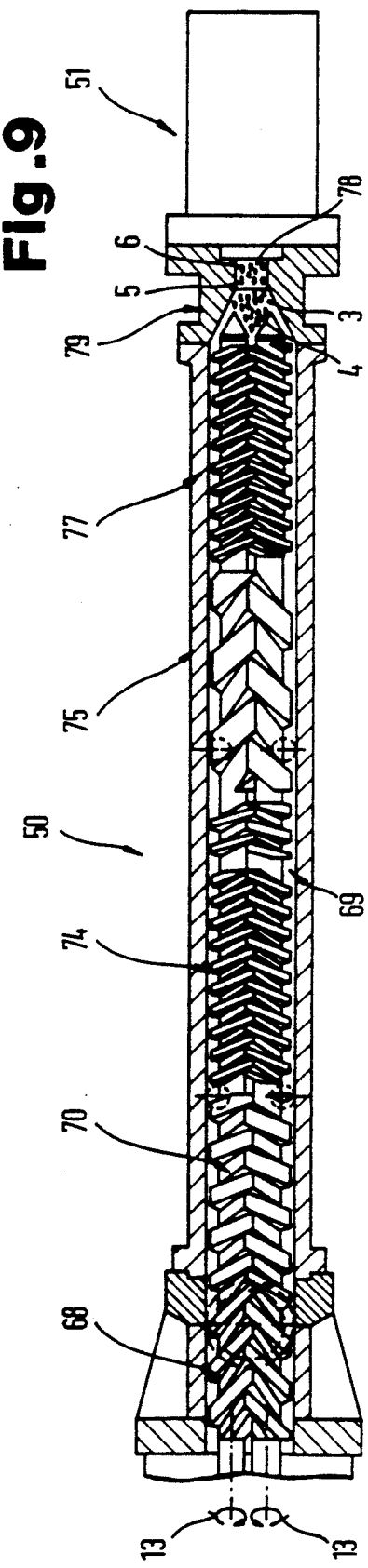

SHAPED PART OF INJECTED OR EXTRUDED PLASTIC WASTE

The invention relates to a shaped part of injected or extruded plastic parts with plastic waste contained in them, with a flow point which is greater than a maximum processing temperature of the shaped part, and these are welded in dispersed form and/or embedded in the shaped part, with a flock size of less than 6 mm. Furthermore, the invention also comprises a method for the production of such a shaped part.

A shaped part of extruded plastic parts with waste plastics contained in them, in which the plastic has a flow point which is higher than the maximum processing temperature of the shaped part is already known—pursuant to U.S. Pat. No. 3,864,193. According to this patent, these waste plastics are welded in dispersed form into the shaped part. The flock size of these waste plastics is less than 6 mm. By adding a small amount of such plastic waste, a plastic sheet or film is to be formed which looks similar to mouth-blown glass. This shaped part cannot be used as a construction element.

The most varied of shaped parts made from waste plastics and also various methods for the production of such shaped parts form waste plastics are already known. In these shaped parts, or respectively in the methods for the production of such shaped parts, until now one has always proceeded from the fact that for the production of shaped parts from waste plastics, these are separated from each other in very costly processes and plastics which are as identical as possible in type are joined together for common reprocessing. All these mostly very involved and therefore also high cost methods and the devices necessary for them involve the disadvantage that an economical production of shaped parts which are able to be stressed to a satisfactory extent as regards bending, tension or respectively stretching, is not possible.

In addition, therefore, a method is known for the production of shaped parts from mixed waste of various synthetic resins—according to British Patent No. 1,521,720—in which it was proposed to heat the plastic waste and to place it under pressure, after which or at the same time as which a fibrous material is mixed in, the individual fibers of which have an average length which is approximately three times as great as an average size of the flocks produced from the waste plastics. The flock size here should preferably be 1 to 4 mm. Through the addition of such fibrous materials, the bending strength, the bending modulus, the heat deflection temperature under load, and also, if applicable, the impact capability, are to be increased. Provision is made here that continuous threads of strips are also used to reinforce the sections. However, one also proceeds here from the fact that an efficient application of the method is only possible when plastics which are as identical as possible in type, or only small proportions of other plastics, are mixed together, in order to thereby actually achieve an increase in strength. Through the separation of the waste plastics into plastics of the same type, and through the costly purification, even with this method the initial costs are very high, so that an economic use is not possible in all cases.

A further problem, in particular in the processing of waste plastics which originate from household refuse, industrial refuse or other collected plastics, such as films, packaging, bottles or the like, lies in the odor nuisance in the finished product. In order to prevent this odor nuisance it is already known—according to EP-OS 0 062 957—to treat the plastic waste, in particular from household refuse, below the softening point of respectively melting point of the plastic with steam and/or with boiling water and thereafter to melt the plastic waste in a substantial absence of water vapor and to process it further. No statements are made with regard to the composition of the household refuse or respectively the components to be used,, and the processing, so that no improvements are able to be achieved with regard to loading capacity.

However, it is also already known—according to DE-OS 35 44 417—to pass on for re-use waste plastics from household refuse in an unprepared state. In order to be able to ensure a sufficient strength and to achieve an improved adhesion between the various plastic parts, it is proposed to blend such a mixture of waste plastics with 20% to 40% superfine wood material and color batch, which act as a binding agent and is intended [sic] to prevent the otherwise usual separation effect when fillers are admixed. The entire substance is heated to a temperature of 100° C. to 210° C., is plasticized and extruded to a billet. This billet is divided up by means of a synchronized scale, and is processed into shaped parts at a temperature between 30° C. and 60° C. A disadvantage in this method is that a high proportion of additives has to be used, and hence the proportion of waste plastics which arrive at being processed becomes less. Through the high proportion of superfine wood material, moreover, an increase in strength is not achieved, so that the components basically can at best be compared with wood as regards their stress properties.

The present invention is based on the problem of creating a shaped part from various, in particular mixed and partially blended waste plastics, the raw material of which, which is used for the manufacture, does not require too extensive preparation work and which can be produced in one processing step with the plasticizing through extruding or injection molding. Moreover, a method is to be created, by which the mixture of waste plastics which usually occurs from household refuse or industrial refuse can be processed into stable shaped parts without previous division into the various types of plastics, and without extensive purification work.

This problem of the invention is solved in that the plastic waste has a flow point above 80° C., at more than 50% of the volume of the shaped part, and a portion has a wall thickness, i.e. thickness of more than 0.5 mm and a further portion has a wall thickness, i.e. thickness of less than 0.5 mm, and this waste is provided with organic and/or mineral impurities, and at least a portion of the plastic waste has a flow point which is higher than the maximum processing temperature of the shaped part, at a maximum of 70% of the volume of the shaped part, and this and also the organic and/or mineral impurities are welded in dispersed form in the shaped part and/or are embedded. The surprising, unforeseeable advantage of this solution lies in that through the mixture of so-called hard and soft plastics, namely plastic waste with wall thicknesses greater than 0.5 mm and less than 0.5 mm and with a flock size of less than 6 mm, with the additional use of plastic waste, the flow point of which is higher than the maximum processing temperature inside the shaped part, through this incompletely plasticized plastic waste a reinforcement structure is formed. It is particularly advantageous here, however, that no foreign materials are necessary in order to produce this reinforcement structure, but rather that through the processing temperature being set below the flow point of a portion of the plastic waste, this is formed by the inclusion of the non-melted plastic particles and also any organic and/or mineral impurities and these are welded or respectively embedded into the plasticized plastic waste. Hence at the same time, they act as adhesion agents for the other plastic components and therefore also increase the strength, because they act in the interior of the shaped part in the manner of a reinforcement structure.

According to another variant embodiment of the invention provision is made that a main dimension of the flocks of the plastic waste with a flow point above the processing temperature and/or the organic or respectively mineral impurities runs predominantly approximately parallel to a direction of the flow—arrow—of a plastic melt of the shaped part and/or a longitudinal extent—arrow—of the shaped part, whereby in the main directions of stress, in the case of deformations, in particular bending and tensile stress, these parts which usually have a higher strength than the plasticized plastic waste can form tension bands which increase the strength. In addition to this is the fact that the plasticized bearing cross-section of the plastic material situated between the embedded or respectively welded-in plastic parts or impurities is not weakened too much, because the small cross-section to a predominant extent comes to lie in these intensely stressed regions.

It is, in addition, also possible that the volume proportion of the plastic waste with a thickness greater than 0.5 mm and a flow point above the processing temperature preferably of over 250° C. is smaller than 30% of the volume of the shaped part, whereby too great reduction to the supporting structure produced from the plasticized basic material of the shaped part can be reliably prevented.

However, it is also advantageous if the volume proportion of plastic waste with a thickness of less than 0.5 mm and a flow point above the processing temperature, preferably of over 250° C. is less than 50% of the volume of the shaped part, because the so-called soft plastic waste has a higher capability, whereby the bending behavior is advantageously improved.

Provision is made, in addition, that the flocks of the plastic waste and/or the organic or respectively mineral impurities embedded in the shaped parts are arranged in all spatial directions distributed over the shaped part approximately uniformly, whereby the strength properties over the entire shaped part are approximately identical and hence a similar basic behavior is achieved as in shaped parts which are produced from pure plastic.

However, it is also advantageous if a volume proportion of the flocks of the plastic waste with a melting point above the processing temperature of a volume region immediately adjacent to a surface of the shaped part, e.g. of a test element is greater than 50% of the volume proportion of the flocks of the plastic waste in a volume region arranged at a distance from the surface of the shaped part, e.g. of a test element thereof, because thereby the effect of the flocks of the plastic waste, which is now recognized as being very advantageous, can also come into effect in the surface regions which are intensely stressed on bending, and nevertheless, a good homogeneity is achieved over the entire cross-section of the shaped part.

It is, in addition, also possible that a volume of the flocks of the plastic waste with a flow point above the processing temperature and/or the organic or respectively mineral impurities amounts to a maximum of 70% of the volume of the shaped part. Thereby it is achieved that in addition a sufficient quantity of plastic waste is present for the embedding and welding of the non-plasticized components or respective impurities and nevertheless in addition a load-bearing shaped part can be achieved.

According to another further development, provision is made that of the volume proportion of the plastic waste of which the flow point lies above the processing temperature of the shaped part, a maximum of 30% of the volume is formed by flocks with a wall thickness, i.e. thickness of greater than 0.5 mm. Thereby, a very fine fibrous supporting structure is achieved through the non-plasticized plastic waste, which contributes to a high degree of strength of the shaped part.

It is, in addition, advantageous if the plastic waste is mixed with a heat stabilizer and/or a light stabilizer, because thereby a greater durability of the produced shaped parts and/or the burning loss of less stable components during the plasticizing of the plastic waste can be prevented.

However, it is also possible that the plastic waste is mixed with a flame inhibitor and/or an oxidation inhibitor, whereby the field of use of the shaped parts is increased, because flame-resistant shaped parts are also able to be produced. Moreover, an additional reduction in quality through too intense oxidation during the processing of the plastic waste can likewise be excluded thereby.

However, it is also advantageous if a dye and/or a UV absorber or an antistatic agent is added to the plastic waste, because thereby a broader range of use can be achieved as with shaped parts produced from a plastic.

According to another variant embodiment, provision is made that a propellant is added to the plastic waste, which, when a previously definable temperature and a previously definable pressure are exceeded foams up and/or releases propellant gases, whereby the sandwich structure formed through the foaming up can be drawn upon for the additional strengthening of the shaped parts and at the same time the total weight of such shaped parts can be reduced, with greater wall thicknesses.

According to another further development, provision is made that up to a maximum of 50% of the volume of the shaped part is formed by fillers, whereby the characteristic properties of such a shaped part produced from waste plastics are retained.

It is, in addition, also possible that the fillers are wood dust and/or calcium compounds, e.g. chalk or talc, because thereby a good connection is achieved especially between the not completely plasticized plastic waste and the fillers.

It is, in addition, also advantageous if in particular fibrous reinforcement elements are introduced distributed over the cross-section of the shaped part which is formed from plastic waste, whereby in particular in the case of endless threads a reinforcement in the tie rod direction can be achieved.

However, it is also possible that the reinforcement elements consist of ceramic, kevlar, carbon or metallic threads and/or of knitted materials or meshes formed from such threads, because at the same time depending on the threads used an antistatic equipping of the shaped parts can be created and moreover, the oscillation behavior of such shaped parts can be improved.

According to another form of embodiment, provision is made that the plastic waste is formed by short threads arranged in different spatial directions, whereby a reinforcement of the shaped part can be achieved in several spatial directions and consequently an approximately uniform increase in strength of the shaped part can be achieved in all spatial directions.

In addition, the invention also comprises a method for the production of shaped parts through the plasticizing of plastic parts containing plastic wastes with a flock size of less than 6 mm, which have a flow point which is greater than a maximum processing temperature of the shaped part and are plasticized under the action of a spiral movement, in particular for the production of shaped parts.

This method is characterized in that a portion of the plastic waste has a wall thickness, i.e. thickness of more than 0.5 mm and a further portion has a wall thickness, i.e. thickness of less than 0.5 mm, and a portion of the plastic waste has a flow point which is higher than the maximum processing temperature of the shaped part, at a maximum of 70% of the volume of the shaped part, and that the plastic waste together with the organic and/or mineral impurities having a flow point which is less than or equal to the processing temperature is plasticized at a processing temperature between 150° C. and 210° C. and with a rising pressure, and the plastic waste and also the impurities with a melting point above the processing temperature at that time and, if applicable, subsequent thereto, are uniformly distributed in the plastic melt, and that this plastic melt is in particular discharge continuously through a nozzle or is injected into a mold. Through the deliberate joint processing of plastic waste having a flow point above the processing temperature, and the fact that the organic and/or mineral impurities can be jointly processed, it is ensured that the plastic waste having a flow point above the processing temperature can be utilized as reinforcement material. Thereby, additional further filler or reinforcement inserts are avoided, and nevertheless a "fiber-reinforced" shaped part is achieved. This surprising finding, however, also makes it possible to considerably reduce the preceding operating processes and expenditure for the preparation of the plastic waste, because the plastic waste and impurities, which were originally regarded as disadvantageous and which were planned to be eliminated by means of extensive prior treatments, can now be deliberately utilized to increase the strength of these shaped parts. The uniform distribution of this non-plasticized plastic waste and impurities serves in particular for this. This process step, which is carried out deliberately, for which the specialist in the art can use steps with which he is familiar, such as suitable kneading processes or mixing processes by separating and welding together the plasticized matter and the like, makes possible a uniform distribution of this non-plasticized plastic waste and impurities over the whole volume of the shaped part and hence uniform strength values.

It is, in addition, advantageous if in the end region of the plasticizing device, for example an extruder, facing the nozzle, a reserve of melt is formed and this is periodically discharged, in particular through the spiral movement, because thereby the melt which is obtained from such plastics can also be utilized for the production of sprayed die castings.

By other further measures, provision is made that the plastic waste, which is mixed with humidity and the impurities and also, if applicable, the additives or respectively fillers are thoroughly mixed and are heated to a temperature of over 100° C., after which the vapors which have arisen up until then are removed, and that the mixture is further compressed and heated at a temperature of over 140° C., but below a previously defined processing temperature, reaction gases are removed from the partially homogenized mixture and thereafter the mixture is plasticized under considerable compression and is heated to the processing temperature, after which the plastic melt with the embedded impurities and the plastic waste which is not yet plasticized, having a melting point which lies above the processing temperature, is discharged through a nozzle or into a mole. Through the heating of the plastic waste in several stages, it is now also possible to further process directly plastic waste which is mixed with humidity without having to dry it first, with an additional supply of energy. Through the fact that in a temperature range of approximately 100° C. the humidity is removed from the plastic waste as water vapour, a disadvantageous effect on the produced shaped parts is not possible, with the chemical degasification taking place separately therefrom in a temperature range of over 140° C. Through this double degasification and the slow heating, the plastic waste having a low point over the processing temperature can be softened to such an extent that a sticking or welding with the materials surrounding it, or respectively the plasticized plastic waste, can occur.

However, it is also possible that the pressure in the plastic melt is additionally increased between the plasticizing device and the nozzle, and that it is discharged at a constant conveying volume, whereby despite the almost haphazard mixing of the plastic waste, homogeneous shaped parts can be produced.

However, it is also advantageous if between the end of the plasticizing device and the outlet from the nozzle or respectively the entry into a mould, non-melted plastic waste or plastic waste which is only partially melted and also the impurities are substantially uniformly distributed over the cross-section of the nozzle or the mould cavity, because thereafter the billet of melt is no longer heavily kneaded, and a degree of distribution which has been achieved can be approximately maintained up to the completion of the shaped part.

According to another form of embodiment, provision is made that the plastic melt is divided up into a plurality of billets of melt running parallel to each other and that these are welded together again immediately thereafter into a stream of melt and thereafter are discharged through the nozzle into a pass or into the mould. It is advantageous here that through the division into several billets of melt in the smaller volume of the melt billet a more intensive thorough mixing, and hence a more uniform distribution of the non-plasticized flocks is possible.

It is, in addition, also possible that the stream of melt is thereafter formed into a three-dimensional web of melt, whereby a degree of distribution of the non-plasticized flocks of the plastic waste which may have been achieved can no longer disturb the distribution already achieved in the formation of a three-dimensionally curved shaped part in the course of an extrusion process.

According to another variant, provision is made that following the nozzle, the web of melt is calibrated and in particular is cooled by a fluid, whereby the achieved distribution and orientation of the non-plasticized plastic waste or respectively the impurities can be maintained and hence fixed in the shaped part.

According to another variant embodiment, provision is made that during the discharging of the plastic melt through the nozzle or respectively into the mould, in particular continuous fibrous reinforcement elements are introduced in the direction of extrusion and/or transversely thereto, whereby even with smaller wall thicknesses, higher bending and tensile strengths of the shaped parts can be achieved.

It is advantageous here if the fibrous reinforcement elements are formed by ceramic, kevlar, carbon or metallic threads and/or knitted materials or meshes formed from such threads, because depending on the type of threads used, differing strength properties can be achieved in shaped parts produced from waste plastics.

It is, in addition, advantageous if several reinforcement elements are arranged distributed over the cross-section of the shaped part, because thereby an additional three-dimensional stiffening is achieved by the reinforcement elements.

According to another further step, provision is made that the reinforcement elements, which are arranged distributed over the cross-section of the shape part are connected with each other, whereby a desired position of the reinforcement elements can be maintained in all spatial directions inside the shaped part.

A simple but effective reinforcement of a shaped part produced from waste plastic is possible in that the reinforcement elements are arranged close to a surface of the shaped part, because especially in the case of bending of the shaped part, tensile stresses occur in the region of the surface of the shaped part or regions immediately adjoining thereto.

However, it is also advantageous if a cover layer is applied onto the three-dimensionally formed melt web, in particular before the passage through the nozzle, because thereby the external appearance and the design can be adapted to a section or respectively a shaped part produced from pure plastics.

However, it is also possible that the cover layer only extends over a portion of the surface of the shaped part, whereby for example only the visible parts of a shaped part, if this is incorporated into a housing or the like, have to be improved by a cover layer.

However, it is also advantageous if the plastic waste is mixed with a propellant, and the propellant foams up the plastic waste, or respectively passes into gaseous state, at a temperature and at a pressure in the end region of the plasticizing zone, because thereby an even better distribution of the waste plastic is achieved during the foaming process within the shaped part.

It is, in addition, also possible that a thickness of the web of melt is greater in the region of the nozzle than in the region of the calibration, whereby an additional strengthening of the shaped part can achieved.

According to another form of embodiment, provision is made that the speed of the stream of melt or respectively the web of melt in the region of the nozzle opening is less than in the region adjoining thereto, whereby the shaped part can be over-stretched or respectively over-expanded during manufacture, and hence better shrinkage behaviour can be achieved at various temperatures.

For a better understanding of the invention, it is explained hereinafter in further detail by means of the example embodiments illustrated in the drawings.

BRIEF DESCRIPTION OF THE DRAWINGS

FIG. 6 shows another shaped part according to the invention, in section and in diagrammatic representation;

FIG. 7 shows an installation to carry out the method for the production of shaped parts constructed according to the invention, in greatly simplified schematic representation;

FIG. 8 shows an extruder for the production of shaped parts according to the invention, in side view, partially in section;

FIG. 9 shows the extruder according to FIG. 8 in plan view in section according to the lines IX—IX in FIG. 8;

FIG. 10 shows an additional device between a nozzle and an extruder for the homogenizing of the melt billet;

In FIG. 1 a shaped part 1 is shown, which consists of a supporting body 2 of plasticized plastic and plastic waste 3 and 4 enclosed therein, and also consists of organic and/or metallic impurities 5,6. Both the plastic waste 3,4 and also the impurities 5,6 consist of flocks 7,8 or respectively 9,10 produced from the plastic pieces obtained in the household, for example. With these plastic pieces, one differentiates fundamentally between hard plastic waste, i.e. essentially plastic waste with a wall thickness greater than 0.5 mm, whilst plastic pieces with a wall thickness less than 0.5 mm is designated as soft plastic waste. If the plastic waste obtained from household refuse is to be further processed, it should be taken into account that this waste is composed of the most varied of thermoplastic and thermosetting materials. Thus, a typical mixture of plastic waste from household refuse consists of approximately 65% polyolefines, i.e. polyethylene (PE) and polypropylene (PP). In addition to this, there are approximately 15% polystyrene (PS) and 10% polyvinylchloride (PVC) and also 5% PET-polyethylene-terephtalate and 5% other plastics. With this mixture, one can assume that they have a very high percentage of so-called plastic waste with a wall thickness less than 0.5 mm, whilst a smaller portion thereof is hard plastics with a wall thickness of greater than 0.5 mm.

Figure 1:
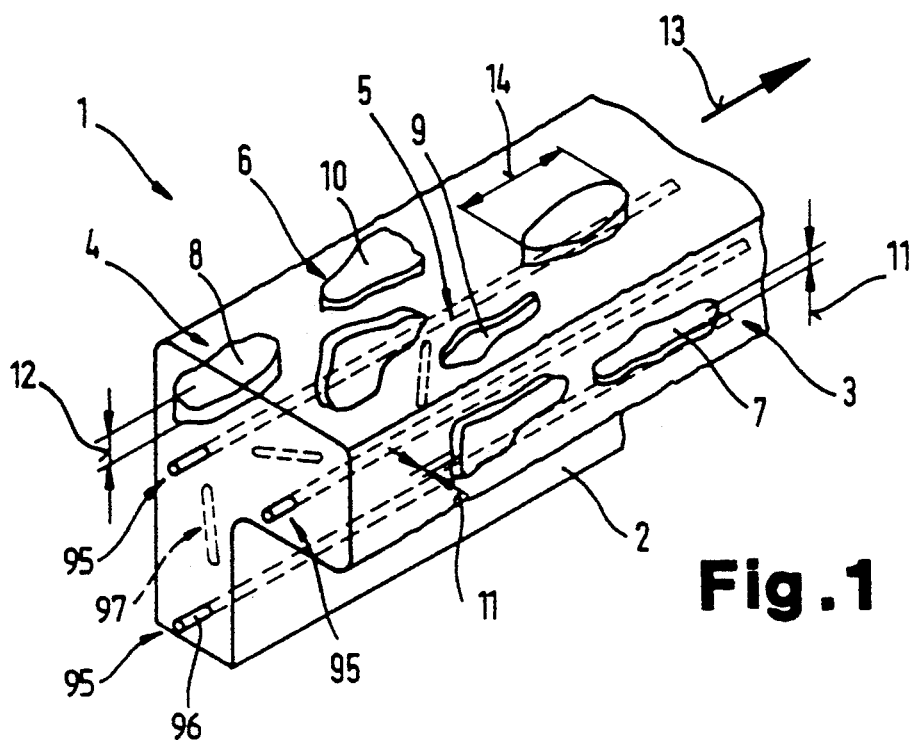
FIG. 1 shows a shaped part according to the invention, in diagrammatic representation and in the manner of a phantom view.

After this plastic waste 3 or respectively 4 has been obtained from household refuse, industrial refuse or other waste materials, collected in any way, in particular mixed materials, these are to be used as far as possible in an unaltered state for the production of shaped parts and are provided with both mineral and also organic impurities 5 or respectively 6. In addition to this is the fact that the above-mentioned plastic waste has different forms of condition at the same temperatures. Whereas some of these plastics are already in plastic state, i.e. above a flow point or respectively a flow temperature, other plastic waste is still in its soft rubber-like or respectively rubber elastic range.

Basically, one can proceed from the fact that thermoplastic plastics, such as, for example, polyvinylchloride, have a hard form of condition, following on from which is a rubber elastic form and finally a soft rubber-like form. The change in state from the hard state to the rubber elastic state takes place with a heating of the plastic waste over the so-called freezing temperature. When the freezing temperature is reached, the molecular degrees of freedom of rotation of all molecule groups are namely stimulated, whereby greater segments of the polymer chains attain inner mobility. However, above the freezing point the molecules still remain connected with each other at particular adhesion points, so that a three-dimensional network structure is produced, which causes the marked rubber elastic behaviour above the freezing temperature.

If the plastics, and this also applies to the plastic waste, are then further heated, the number of adhesion sites rapidly decreases as the temperature rises, whereby the material becomes increasingly rubber-like. If the so-called flow point is then exceeded, then the network structure is finally disintegrated fully and the deformation of the plastics or respectively also of the plastic waste takes place largely in a plastic manner.

These two essential temperature thresholds, namely the freezing temperature and the flow temperature or respectively the flow point vary greatly, however, in the various plastics contained in particular in household refuse, not least owing to the differing doping. Whereas the flow point or melting point for PVC lies above 120° C. depending on the doping, it is approximately 270° C. for polyethylene terephthalate (PET). The result of this is that at a processing temperature between approximately 150° C. and 220° C., the plastic waste 3 and 4 and impurities 5 and 6 of which the flow point lies above this processing temperature range, or respectively which do not yet melt at these temperatures and do not burn either, are embedded or respectively welded into the supporting body 2. The supporting body 2 consists of all the plastic waste, of which the flow point lies below the processing temperature of approximately 150° C. to 220° C. and which, as will be later explained by means of the illustrated device, are thereby plasticized and mixed with each other, so that they form a uniform composite of effective substance.

From the diagrammatic illustration in FIG. 1 it can be seen, in addition, that the plastic waste 3,4 may have differing wall-thicknesses or thicknesses 11,12. In the case of the plastic waste 3 in which a thickness 11 is less than 0.5 mm, these are so-called soft plastics, whilst in the case of the plastic waste 4 with a thickness 12 which is greater than 0.5 mm, these are hard plastics. In addition to this is the fact that the plastic waste shown in FIG. 1 all has a flow point or respectively a flow temperature which lies above the processing temperature and which was therefore not plasticized.

At the same time, it can be clearly seen from this diagrammatic illustration that the individual plastic waste 3,4 or respectively impurities 5,6 are aligned approximately parallel to a longitudinal direction—arrow 13—of the shaped part 1. Thereby they form an internal reinforcement framework running in the longitudinal direction of the shaped part, whereby both the bending strength and also the tensile strength of such shaped parts 1 is increased. Through the alignment of the non-plasticized plastic waste 3,4 in longitudinal direction—arrow 13—of the shaped part 1 it is prevented that the supporting body 2 undergoes a constriction in the region of the maximum dimensions of the plastic waste, which owing to the differing alterations in state of the various plastics at the processing temperatures does not lead to any melting or respectively to any satisfactory form-locking connection. Through this, it is prevented that in the region of this plastic waste 3,4 or respectively plastic waste flocks fractures occur with bending or respectively tensile stresses through too great a constriction of the cross-section. A flock size, which in the present drawing is represented on an enlarged scale for a better understanding of the invention, is less than 6 mm. This means that a maximum main dimension 14 can not be greater than 6 mm. Preferably here the maximum size, i.e. the main dimension 14 of the plastic waste 3,4 or respectively impurities 5,6 is set at 3 to 4 mm.

The alignment of the plastic waste 3,4 and the impurities 5,6 is brought about in that the plasticized plastic material of the supporting body 2 is thoroughly kneaded in the smallest possible quantities and can thereby align itself in the conveying direction of the plasticized plastic melt. Through a corresponding guiding of the plasticized plastic melt, it is achieved that this alignment can also still be maintained in the finished shaped part 1.

Figure 2:
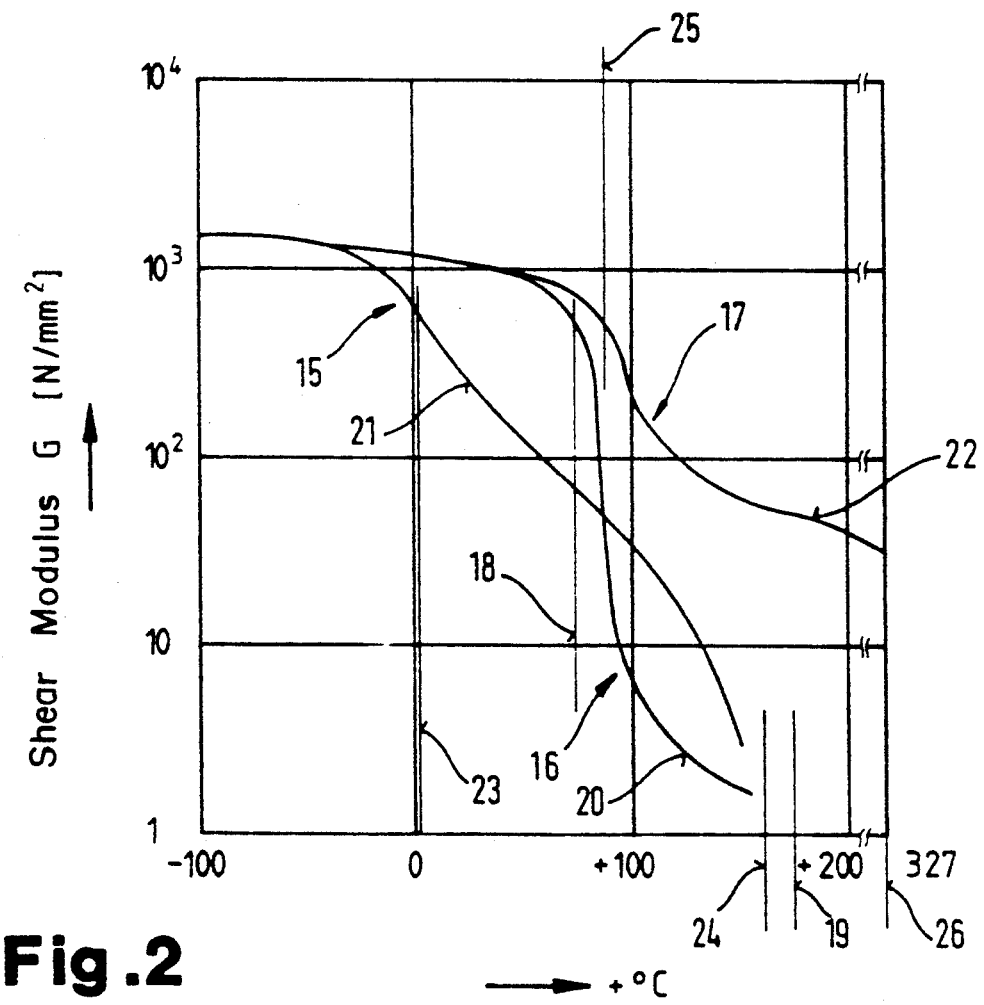
FIG. 2 shows a diagram which displays the tensile strength of various plastics as a function of temperature.

In FIG. 2 the path of the modulus of shear is shown in a diagram as a function of the temperature for various plastics such as poleolefines 15 e.g. polypropylene, hard PVC 16 and crystalline polyethylene terephthalate (PET) 17. From this illustration, it can be seen that a freezing temperature 18 for PVC is reached when the PVC is heated to approximately 80° C. and a flow temperature 19 at approximately 175° C. In the region of the freezing temperature 18 or respectively the freezing point, as can be seen from a characteristic 20 of the diagram, the modulus of shear decreases sharply. On further heating of the PVC's, the modulus of shear moves depending on the doping e.g. at approximately 160° C. towards zero. At approximately 175° C. the flow point or respectively the flow temperature 19 is reached, designated as glass transition temperature or respectively fusion temperature. This flow temperature corresponds to the lowest extrusion temperature. From this flow temperature 19, the PVC is in a plastic state, in which the network structure is completely disintegrated, and which can also be designated as fusion temperature. On heating between the freezing temperature 18 and the flow temperature 19, the plastic passes more and more from a rubber elastic state into a soft rubber-like state.

As further characteristics 21,22 show, compared with the characteristic 20 of the PVC 16, for example in the case of polyolefines 15, e.g. polypropylene, a freezing temperature 23 is already reached at approximately 0° C., whereas a flow temperature 24 of this plastic lies at approximately 164° C. and the modulus of shear is no longer able to be measured from approximately 15° C. However, the characteristic 22 of polyethylene terephthalate 17 clearly differs from this, because in the case of this plastic, for example, a freezing temperature 25 is exceeded at approximately 80° C. and the flow temperature 26 at approximately 327° C. is if necessary also exceeded at higher temperature.

As can therefore be seen from comparing the characteristics 20,21 and 22, the plastic waste made from polyethylene terephthalate at a processing temperature between approximately 150° C. and 210° C. is only in its rubber elastic state, whereas almost all other materials such as PVC 16 and polyolefines 15 are already in their plastic state and a viscous flowing has begun. Hence, the plastic waste which is not yet in fact plasticized but, however, has at least already reached the rubber elastic state on its surface, can weld or respectively stick superficially to the plasticized plastics which have a considerably lower melting point or respectively flow temperature 19 or respectively 24, and thereby a transfer of force is possible to a greater or lesser extent.

In FIGS. 3 to 6, shaped parts 1 produced from plastic waste are shown: in FIG. 6 a U-section 27 and in FIG. 2 a round rod section 28.

As can be seen from these diagrammatic illustrations, in particular in the region of the sectional plane of the round rod section 28 and in the region of the end edges of the U-section 27, the plastic waste 3,4 or respectively the mineral and metallic impurities 5,6 are aligned with their main dimension or respectively longitudinal dimension in the longitudinal direction—arrow 13—of the shaped part 1. It is, however, also additionally advantageous in the shaped parts 1 according to the invention, that the distribution of this plastic waste 3,4 and the impurities 5,6, which can not be melted during the plasticizing of the entire plastic waste for example from household refuse, is distributed over the entire cross-section of the U-section 27 or respectively of the round rod section 28 substantially uniformly.

Figure 3:
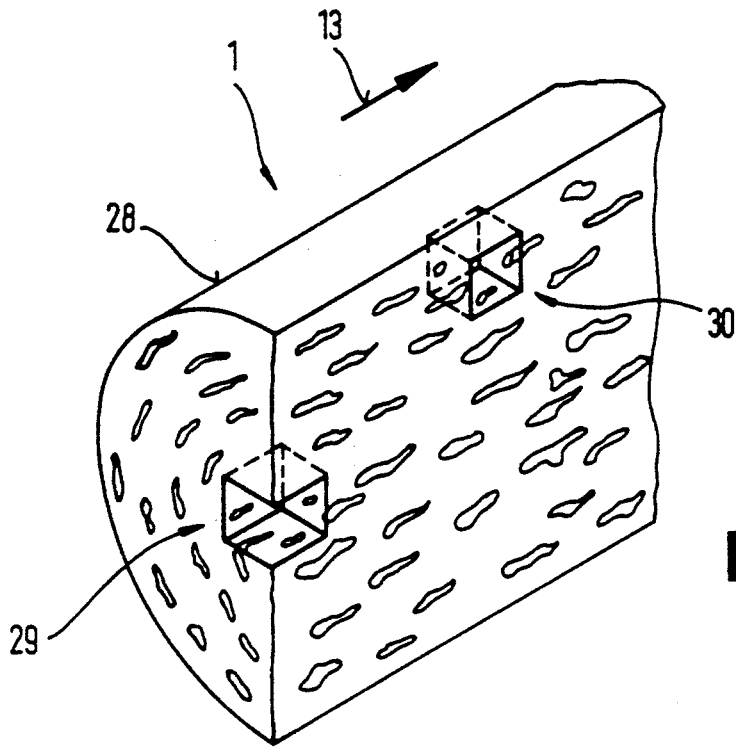
FIG. 3 shows, in diagrammatic representation, a part of a shaped part constructed according to the invention, as a round rod solid section.

This means that, as is illustrated diagrammatically in FIG. 3 for a better understanding, the volume of the non-plasticized plastic waste 3,4 and impurities 5, 6 in a test element 29, which is removed from a central region of the round rod section 28, corresponds to at least 50% of the volume of such plastic waste 3,4 or respectively impurities 5,6 of a test element 30, which has an identical volume to the test element 29. Depending on the purpose of use of the shaped parts 1, through a corresponding division of the plastic melt into several differentially shaped melt billets within the nozzle or respectively extrusion device, the quantity of the non-melted plastic waste 3,4 or respectively impurities 5,6, i.e. the inclusions in the plastic waste which is melted or respectively plasticized during the manufacture of the shaped parts 1, can be altered.

Figure 4:
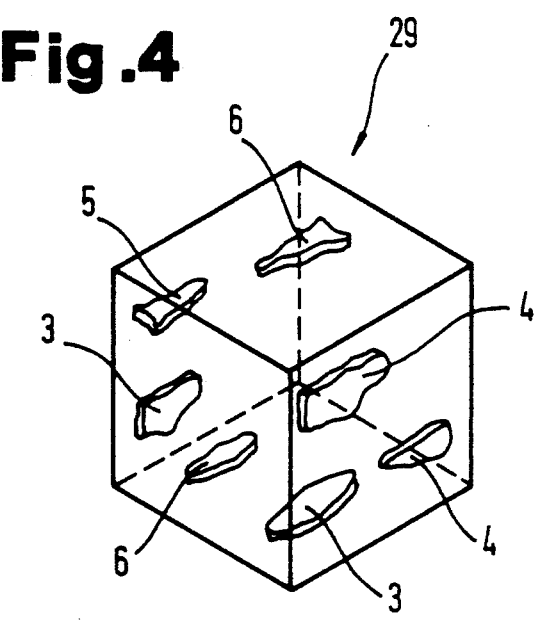
FIG. 4 shows in diagrammatic representation a test element cut out of a central region of the shaped part according to FIG. 2.
Figure 5:
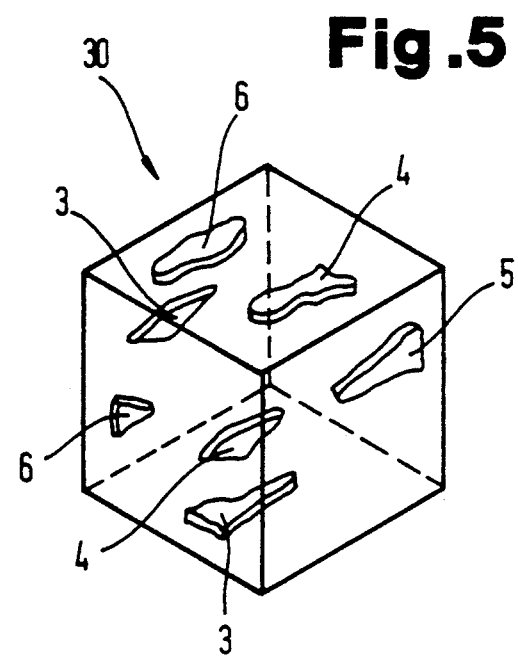
FIG. 5 shows in diagrammatic representation a test element cut out from the surface region of the shaped part according to FIG. 3.

In order to show better these test elements and the distribution of the non-melted plastic waste 3,4 and impurities 5,6, in FIGS. 4 and 5 the two test elements are shown on an enlarged scale. As can be seen, and as is shown in the drawing diagrammatically, in these test elements 29,30 non-plasticized plastic waste 3,4 and the impurities 5,6 are in almost the same volume.

Thereby it is, inter alia, also prevented that greatly differing strength varies arise with regard to tensile strength and bending strength over the cross-section of shaped parts produced from such plastic waste.

It is, possible, as such, that for example in the test element 29, which was taken from the central region of the round rod section 28, a greater proportion of such non-plasticized plastic waste 3,4 or respectively impurities 5,6 is included, as this region in this solid section forms the neutral zone, which is less stressed. As in the processing of household refuse, which represents a particularly preferred field of application of the present invention, a certain average mixture of various plastics is contained, which could only be altered at a very high expenditure, it is more favourable to distribute this approximately evenly over the cross-section of the section, so that overfilling, and hence zones with substantially less capacity to withstand stresses, is prevented.

However, owing to the desired strength properties of a section produced from such recycled plastics, it is desirable that in the more highly stressed marginal zones a somewhat smaller proportion of non-plasticized plastic waste 3,4 or respectively impurities 5,6 is contained; this can thus be achieved in that a higher percentage of these materials is brought specifically into the core region of the sections.

Of course, the division or respectively the differing volumes of the non-plasticized waste plastics and impurities which are contained in the shanks or respectively in the base of the U-section 27 according to FIG. 6 behave in a similar or even identical manner to that in the round rod section 28. If, in the case of this U-section 27 one removes from a shank or the base correspondingly more small dimensioned test elements from the central region and from the region of the surface, then there results approximately the same ratio between the volume of the non-plasticized plastic waste 3,4 or respectively impurities 5,6 welded or respectively embedded into these test elements.

In FIG. 7 a device 31 is shown, with which shaped parts 1 can be produced according to the method in accordance with the invention.

The method is carried out such that from delivered household refuse 32, in a pre-sorting installation 33 the reusable plastic waste 34 is extracted. This is passed to a separating device 35, in which the plastic waste 34, if desired, is washed, and thereafter is divided into hard and soft plastics 36,37. This may take place, for example, through a gravity separating in water. The hard plastics 36, and likewise the soft plastics 37 are passed to mills 38,39, in which they are processed to a flock size of less than 6 mm. The hard waste then arrives directly into an intermediate reservoir 40, whilst the soft plastics 37 are passed to an intermediate reservoir 42 via a compressor 41. In addition, further storage containers 43,44 are provided, to hold additives 45 and fillers 46. These additives 45 may be formed, for example, by heat stabilizers, light stabilizers, flame inhibitors or oxidation inhibitors. However, it is also possible to use dyes and UV-absorbers or antistatic agents as additives. Wood dust or respectively calcium compounds, e.g. chalk or talc may especially by used as fillers.

Although in the present example embodiment, only two storage containers 43 and 44 for additives 45 and fillers 46 are shown, it is, of course, possible within the framework of the invention, to install or respectively use several such storage containers 43 with different additives or respectively several storage containers 44 with different fillers. Thereby, it is possible to achieve any desired mixture and alteration to the properties of the plastic.

Depending on the desired mixture ratio of the individual components, these are then passed to supply containers 48 via a weighing device 47. From these containers, the prepared quantities of raw material are passed to a filling device 49 of an extruder 50. The plasticized plastic then arrives through a nozzle 51 to a further extruder 52 with which for example a cover layer of pure plastic with precisely predefined properties can be applied. If it is a complicated component, which, for example, must be multi-coloured, or respectively is exposed to different stresses on different side sections, then a further extruder 53 can be connected after this extruder 52, with which further extruder a further additional layer can be applied in different regions or also in regions in which an additional layer has already been applied by the extruder 52. Following on therefrom, the shaped parts are formed in a cooling- and calibrating device 54 to their final cross-section and run through a caterpillar outlet 55. The shaped part 57, which is extruded continuously, can be cut to length by a saw 56 into sections 58 with predeterminable lengths.

In FIG. 6 it was indicated diagrammatically how, for example, with the extruder 52, a cover layer 60 can be applied on a shank 59 of the U-section 27 in FIG. 6. This cover layer 60 may serve to produce an additional tension band and hence increase the capacity to withstand tensile and bending stresses of the U-section 27 accordingly. On the other hand, the cover layer may also be provided exclusively or additionally for visual reasons, in order to make possible a desired colour selection and a continuously smooth surface. Thus, under certain circumstances, it is also, in addition, possible that this cover layer 60 covers the entire outer periphery of the U-section 27. Moreover, for example, with the extruder 53 a cover layer 52 can be applied on an inner side, i.e. on the surfaces of the shanks 59 and 61 which face each other. However, it is likewise possible, as indicated by dashed lines in the region of the cover layer 60, to apply onto the cover layer 60 or over a portion of this cover layer 60 a further reinforcement layer 63 by means of the extruder 53, which further layer makes corresponding properties possible, such as good gliding ability or partial reinforcement against deformations.

In FIGS. 8 and 9 the extruder 50 for the production of the shaped parts 1 is shown on an enlarged scale and partially in section.

As can be seen, the filling device 49 arranged in front of the extruder, comprises a receiving container 64, in which a worm conveyor 65 is provided, into which the mixture of the plastic waste 3,4,66,67 is introduced, which, for a better understanding, is represented diagrammatically by different geometric shapes. Thus, the mixture consists of the waste plastics, through plastic waste 3,4 with wall thicknesses of less than or respectively more than 0.5 mm and with a flow point above the processing temperature, and also plastic waste 66,67, of which the plastic waste 66 has a wall thickness below 0.5 mm and the plastic waste 67 has a wall thickness over 0.5 mm. This plastic waste 66 and 67, however, has a flow point or respectively a flow temperature, which lies within the processing range of approximately 150° C. to 210° C. As can be seen from the diagrammatic illustration, the proportion of plastic waste 66 and 67 clearly predominates with respect to the mass or respectively volume of the plastic waste 3 and 4. Between these different types of plastic waste 3,4 and 66,67 there are, in addition, impurities 5 or respectively 6 of organic or respectively mineral materials. This mixture of plastic waste, such as is supplied for example from household refuse recovery or respectively separation or from industrial refuse or from various collected plastics, is drawn into in intake region 68 of a plasticizing device, which is formed by a worm 69. In a pre-compacting zone 70 a compacting and heating of the plastic waste 3,4 or respectively 66,67 and the impurities 5,6 is carried out through the forward pressing and kneading and also friction between the worms 69 which rotate according to the arrows 13. In this pre-compacting zone 70, a plastic mixture 71 is heated to a temperature of approximately 100° C., so that humidity evaporates, which is indicated diagrammatically by drops 72 in the receiving container 64.

These vapours which occur on heating to approximately 100° C. are discharged into the atmosphere through a degasification outlet 73. Following on from this, a heating of the plastic mixture 71 to a temperature of approximately 140° C. takes place in an intermediate compacting zone 74. This, in turn, takes place in that the plastic mixture is kneaded and pressed through two worms 69, which rotate in opposite directions, and, as can be seen better from FIG. 9, are arranged adjacent to each other and are in engagement with each other, or respectively through external supply of heat via the cylinder holding the worms 69. Joining on to this intermediate compacting zone 74 is a pressure release zone 75, in which the pressure is lowered by means of relatively wide spirals, so that gases which have accumulated in the plastic mixture can escape therefrom. These gases are removed through a further degasification outlet 76, and if necessary are delivered to the open atmosphere after corresponding filtering. Thereafter, in the plasticizing zone 77, a further heating and thorough mixing of the plastic mixture takes place, and at the end of the two worms 69, in the region of a conveying opening 78 to a nozzle 51, there is a plastic melt 79, in which the non-plasticized or respectively melted plastic waste 3,4 or respectively impurities 5,6 are contained. Since according to the different intake conditions a complete homogenizing can not always be guaranteed with such plastic mixtures or plastic waste, differences in homogeneity or respectively in density may result in the plastic melt 79.

If a correspondingly uniform composition of the plastic waste is possible, as for example in the re-use of waste materials which occurred in the production of plastic, then the plastic melt 79 can be introduced directly into the nozzle 51.

As shown in FIG. 10, it is, however, also possible, in order to maintain a uniform thickness and a sufficient homogenization of the plastic melt 79 with the inclusions formed by the non-plasticized plastic waste 3,4 or respectively the impurities 5,6, to arranged after the conveying opening 78 a melt pump 80 formed for example by a geared pump, which ensures that a uniform volume of plastic melt 79 is passed to the nozzle 51 at a uniform pressure. This nozzle 51 may be a solid or a cavity section nozzle, This nozzle may therefore be constructed for the production of solid sections, as shown in FIG. 3, or for the production of curved sections, for example U-sections, as shown in FIG. 5, or for the production of hollow sections with reinforcement cross-pieces lying in the interior, or the like.

Figure 11:
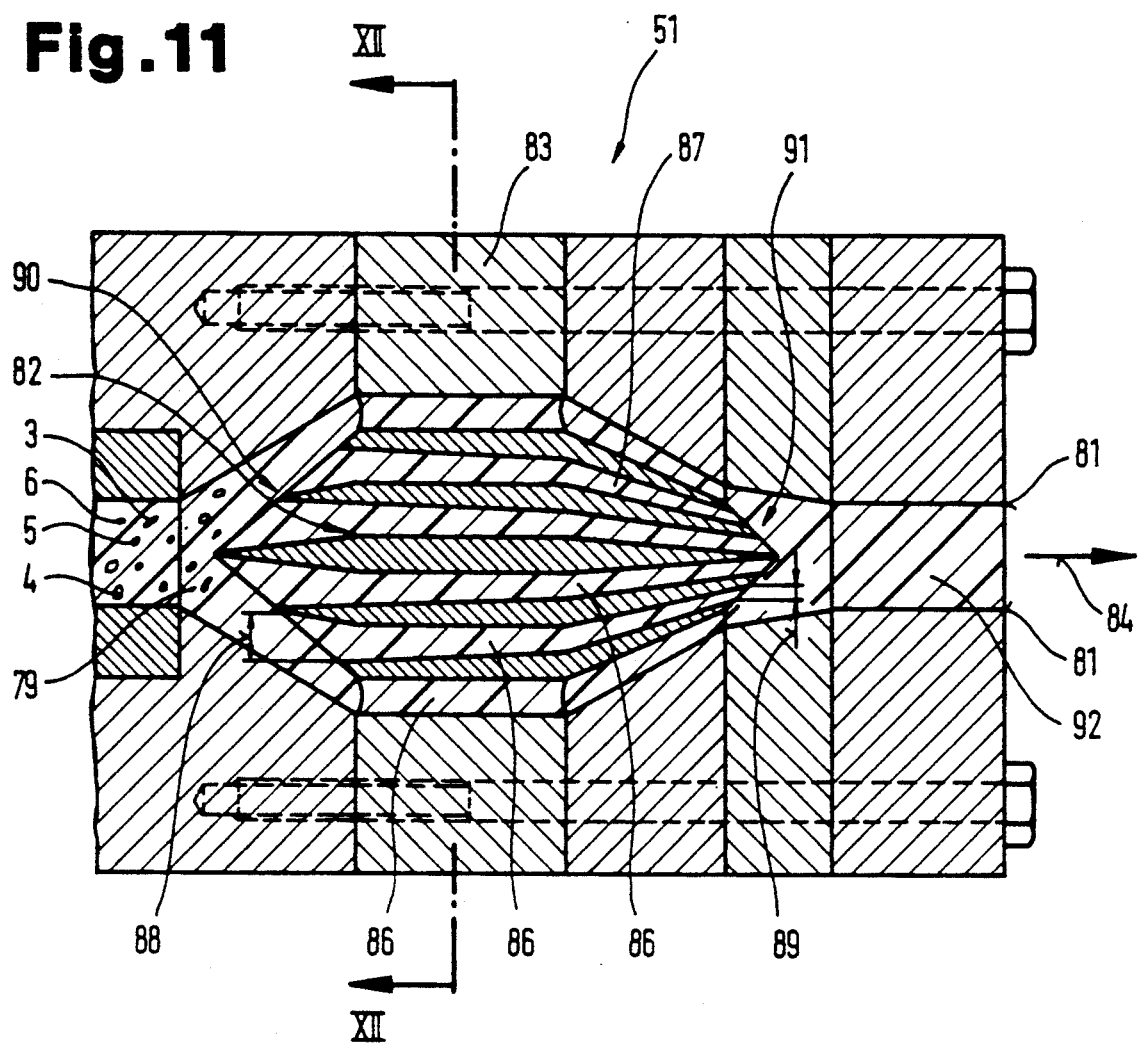
FIG. 11 shows a mixing device for the thorough mixing of the flocks of the non-plasticized waste plastics and their uniform distribution in the plasticized plastic melt, in side view in section according to the lines XI—XI in FIG. 12.
Figure 12:
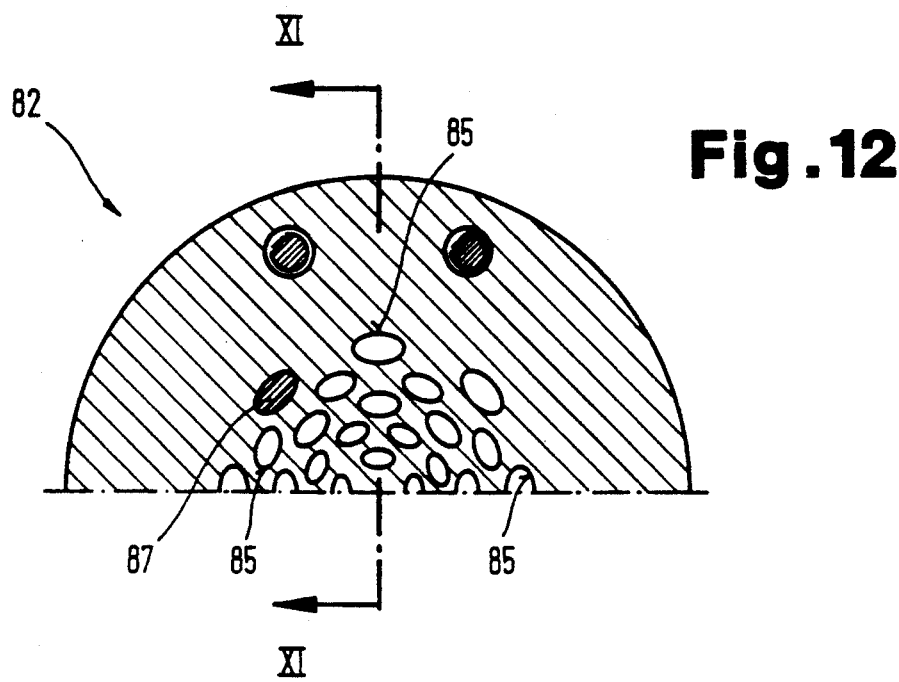
FIG. 12 shows a portion of the mixing device according to FIG. 7 in front view according to the lines XII—XII in FIG. 11.

In FIGS. 11 and 12, a mixing device 82, arranged in front of nozzle lips 81 of a nozzle 51, is provided, for the plastic melt 79 supplied via the conveying opening 78, in which the impurities 5,6 or respectively non-plasticized plastic waste 3,4, which form the inclusions, are indicated diagrammatically by dots or respectively by circles. This mixing device 82 consists for example of a nozzle plate 83, in which nozzle bores 85 with differing opening cross-section are arranged, e.g. in concentric circles, over the entire surface vertically to an extrusion direction—arrow 84—and as can be seen better for example from FIG. 12.

Through this division of the plastic melt into a plurality of melt billets 86,87 running substantially parallel to each other, a mixing is achieved over the entire cross-section of the plastic melt 79. Whereas usually in the production of hollow or solid sections, too great a division of the plastic melt 79 into too many melt billets 88,87 is avoided whenever practicable, in order to avoid the subsequent fusing of the melt billets into a uniform stream of melt or respectively on reforming into a melt web for the production of a U-section 27, this division of the plastic melt 79 into a plurality of melt billets 86,87 with differing cross-section proves to be an advantageous variant embodiment for the processing of plastic waste, in particular from household refuse or industrial refuse. Thereby, the plasticized plastic waste is thoroughly mixed with the non-plasticized plastic waste or respectively impurities more intensively, and thereby a more uniform distribution can be achived, and, above all, an alignment with its longitudinal dimension in longitudinal direction of the section or respectively of the extrusion direction—arrow 84—with a higher degree of certainty.

It may also prove to be advantageous here if a cross-sectional face or respectively an opening width 88 is reduced in the extrusion direction—arrow 84—to an opening width 89, or if applicable this opening width 88,89 has several constrictions over the length of the nozzle bores 85. All this contributes to the better alignment or respectively mixing of the inclusions such as the impurities 5,6 and the non-plasticized plastic waste 3,4 in the supporting body 2 of the plasticized plastic waste 66,67.

An inlet region 90 and and outlet region 91 may, moreover, be constructed so as to be conical or respectively tapered, in order to improve the flow of the plastic melt 79 through the mixing device 82. In the outlet region 91 or respectively immediately adjoining thereto, the individual melt billets 86,87 are united again into a homogeneous melt stream 92. In the case of solid sections with a cylindrical cross-section, this stream can be discharged directly via the nozzle lips 81 or for example in the case of hollow sections or sections with a three-dimensionally curved cross-section, such as, for example U-sections 27, it can be deformed into a melt web of any desired shape.

The configurations of the nozzles necessary for this are known from the prior art in various forms of embodiment, and these may be used in connection with the described devices to carry out the method according to the invention and for the production of shaped parts according to the invention, in the same manner.

Obviously, in the course of the plasticizing or respectively homogenizing of the plastic waste in the extruder 50, a corresponding heating and/or cooling takes place of the cylinders or respectively cylinder walls containing the worms 69, so that the respectively desired temperatures can be applied over the longitudinal course of the worms 59. The type of application of temperature or respectively its regulation and control and also the determining of the individual pressures can be carried out according to the methods known from the prior art.

As is further indicated in FIG. 1, it is also possible to additionally reinforce the shaped part 1 through the introduction of fibrous reinforcement elements 95. These may, for example, be formed by ceramic, kevlar, carbon or metallic threads. These reinforcement elements or respectively the threads may be constructed as a knitted material or mesh, but, on the other hand, it is also possible to provide several reinforcement elements distributed over the cross-section of the shaped part, which are connected with each other.

Thus it is also possible to arrange the reinforcement elements 95 or respectively the threads 96 in the region of the surfaces of a section, in order to increase the bearing strength or respectively the bending strength thereof. If, by comparison, short fibres 97 are used, which are arranged in different spatial directions in the shaped part 1, then frequently a reinforcement of the shaped part is achieved in different spatial directions.

Figure 13:
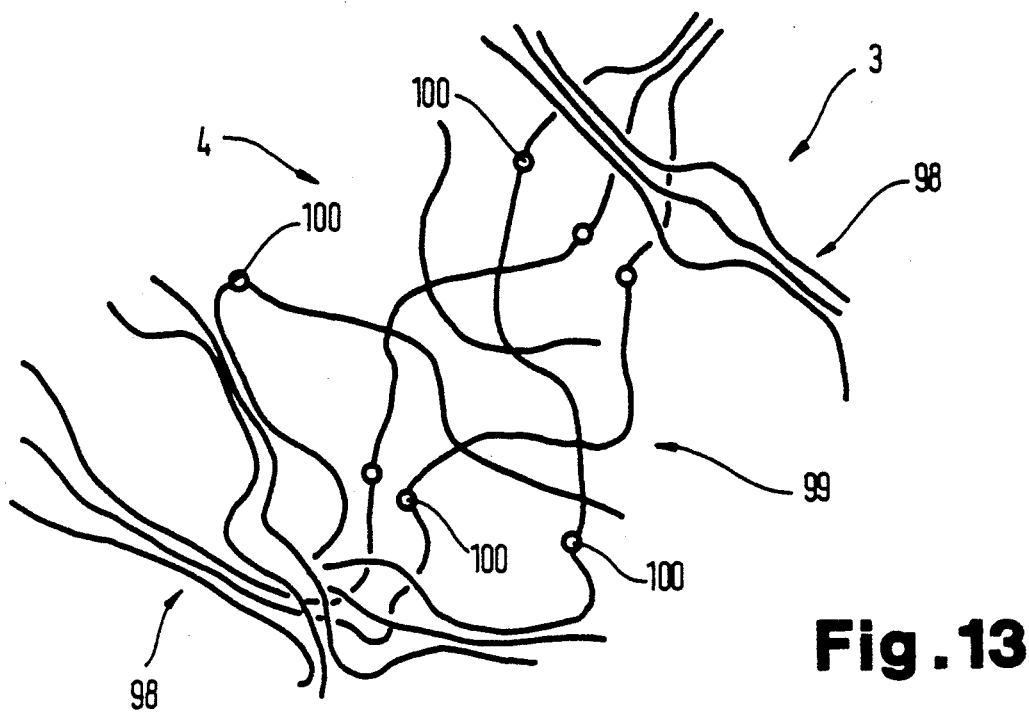
FIG. 13 shows various polymer chains and their connection in diagrammatic simplified representation.

As shown in FIG. 13, in accordance with an embodiment according to the invention, which in particular is also independent, a chain conection is possible between the polymer chains 98,99 of the plastics of different polymer chains of the melted plastic waste 3 or respectively 4 via an inherent polymer material 100.

This additional polymer material 100 which could also be designated as an adhesion agent, can produce a chemical bond between the different polymer chains 98,99 of the plastic waste 3,4.

The advantage of the use of such adhesion agents lies in that the different types of plastics present in the shaped part 1,57 do not form supporting frameworks lying adjacent to each other, which are loaded in shear, but rather produce a supporting body cross-linked with each other in a uniform manner, which accordingly is also able to be loaded to a considerably higher extent.

Thus it is also possible inter alia that the polymer chains 98,99 may be formed by amorphous or respectively crystalline thread molecules. Such crystalline or respectively partially crystalline thermoplasts may be formed for example by polypropylene, polyamides or polyethylenes. The amorphous thermoplasts in turn may be formed by ABS, polycarbonates or polysulphones.

However, it is also possible that the polymer chains are formed by elastomers or thermoplastic elastomers. By means of corresponding adhesion agents or respectively an additional polymer material 95 it is also possible to bond these substances with each other chemically.

Thereby, as already indicated above, a chemical bond is produced between the individual polymer chains and these are held against each other not only through adhesion or respectively physical forces.

Inter alia it is, however, also possible, for the improved surface design of products manufactured from such recycling materials, to construct at least the surfaces visible to the observer on use so as to be as smooth as possible. For this, the shaped part may be constructed as a sandwich part, in which one or more cover layers, separated from each other by core elements, surround the core receiving a major part of the impurities which are unable to be melted.

These optical cover layers may be produced by a coextrusion by extruding on of pure base material.

Figure 14:
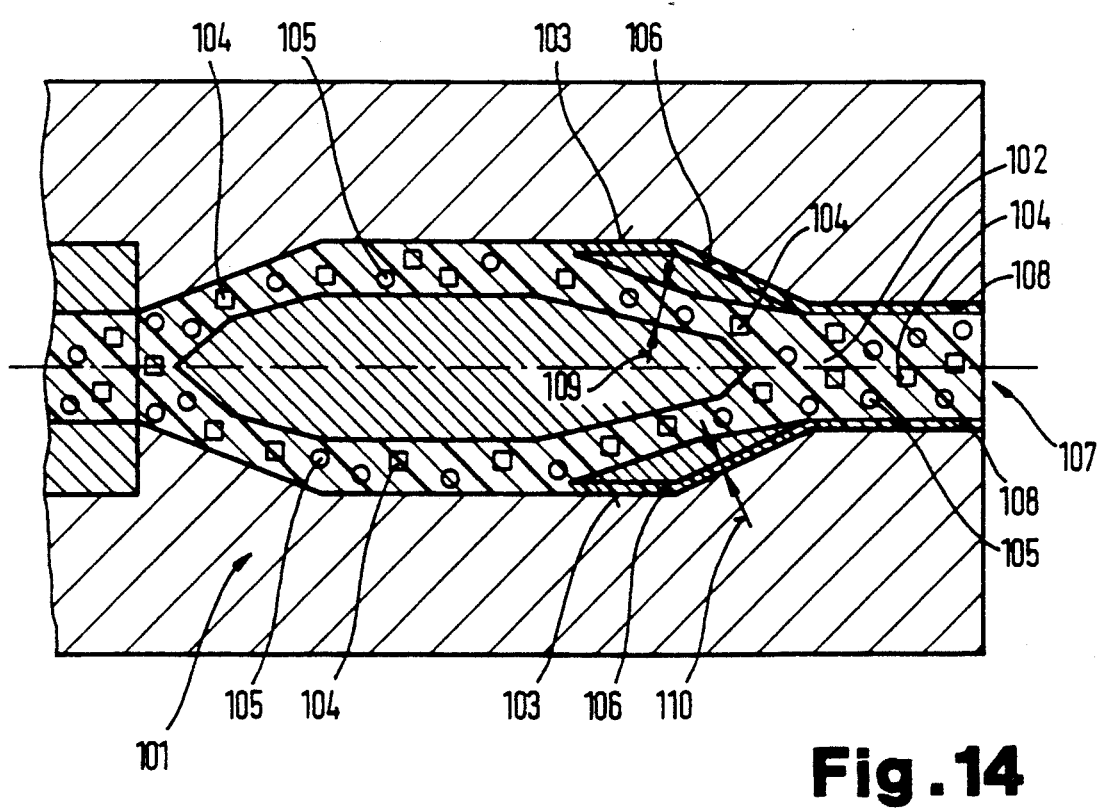
FIG. 14 shows a nozzle for the processing of recycling plastics in side view, in section and in greatly simplified diagrammatic representation.

However, as shown in FIG. 14, it is likewise possible to arrange auxiliary channels 103 in the nozzle 101, running parallel to the main channel 102, which auxiliary channels have such a small cross-section that impurities 104 or respectively plastics materials or respectively waste 105 which are not melted, can not pass through it. The partial quantities of plastics material 106 thus separated, freed of impurities 104 or respectively plastics materials or waste 105 which have not melted, and plasticized and transported through the auxiliary channel 103, may be applied as a cover layer 108 over the core parts 107 of the section which are to be covered. Thereby it is possible to produce a sandwich construction with such shaped parts 1,57, without supplying a further material via a special extruder.

The separation of the non-melted plastics particles and also the impurities is successful through the design of the parallel or respectively auxiliary channels 103 with a considerably smaller cross-section 109 compared with the cross-section 109 of the main channel 102, so that owing to the increased entry resistance larger impurities 104 or respectively non-melted plastics materials or respectively waste 105 emerge through the main channel 102 with a smaller flow cross-section and consequently can be drawn upon to form the central part or respectively core part 107 of the section. Of course, it is also possible that the cover layers 108 may be produced on the inner and outer sides of the sections or only on individual surfaces or as strips on these surfaces.

I claim:

1. A shaped part comprising a body of plastic material, plastic waste particles and particles of impurities distributed therethrough and embedded therein, more than 50% of the volume of the shaped part consisting of the plastic waste particles and the plastic waste particles having a flow point of more than 80° C. and a length of less than 6 mm, a portion of the plastic waste particles have a wall thickness of more than 0.5 mm and the remaining portion of the plastic waste particles having a wall thickness of less than 0.5 mm, and up to 70% of the volume of the shaped part comprising plastic waste particles having a flow point exceeding the maximum processing temperature of the plastic material of the body.

2. The shaped part of claim 1, wherein the embedded plastic waste particles are welded in the plastic material body.

3. The shaped part of claim 1, wherein the particles predominantly extend substantially parallel to each other along a length dimension of the shaped part.

4. The shaped part of claim 1, wherein less than 30% of the volume of the shaped part comprises the portion of the plastic waste particles have a wall thickness of more than 0.5 mm.

5. The shaped part of claim 4, wherein said portion of the plastic waste particles has a flow point exceeding 250° C.

6. The shaped part of claim 1, wherein less than 50% of the volume of the shaped part comprises the portion of the plastic waste particles having a wall thickness of less than 0.5 mm.

7. The shaped part of claim 6, wherein said portion of the plastic waste particles has a flow point exceeding 250° C.

8. The shaped part of claim 1, wherein the particles are distributed throughout the body of plastic material substantially uniformly in all directions.

9. The shaped part of claim 1, wherein up to 30% of the volume of the plastic waste particles having a flow point exceeding the flow point of the plastic material of the body have a wall thickness of more than 0.5 mm.

10. The shaped part of claim 1, wherein the plastic material is formed.

11. The shaped part of claim 1, wherein up to 50% of the volume of the shaped part is comprised of a filler.

12. The shaped part of claim 1, further comprising filamentary reinforcing elements embedded in the shaped part over a cross section containing the embedded plastic waste particles.

13. The shaped part of claim 12, wherein the filamentary reinforcing elements are interconnected.

14. The shaped part of claim 12, wherein at least some of the filamentary reinforcing elements are arranged close to a surface of the shaped part.

15. The shaped part of claim 1, further comprising a cover layer extending over a part of the surface of the shaped part.

16. The shaped part of claim 1, wherein the plastic waste particles are constituted by randomly oriented short filaments.

17. A method of producing a shaped part comprising a body of plastic material, plastic waste particles and particles of impurities distributed therethrough and embedded therein, the plastic waste particles having a length of less than 6 mm and a flow point of more than 80° C., more than 50% of the volume of the shaped part comprising the plastic waste particles, a portion of the plastic waste particles having a wall thickness of more than 0.5 mm and the remaining portion of the plastic waste particles having a wall thickness of less than 0.5 mm, up to 70% of the volume of the shaped part comprising plastic waste particles having a flow point exceeding the maximum processing temperature of the plastic material of the body, which comprises the steps of mixing particles of the plastic material, the plastic waste particles and the particles of impurities to obtain a mixture of particles, plasticizing the plastic material particles at a processing temperature between 150° C. and 210° C. while subjecting the mixture to a spiral movement and increasing pressure to obtain a melt of the plastic material wherein the plastic waste particles and the particles of impurities are substantially uniformly distributed and embedded, and shaping the melt.

18. The method of claim 17, wherein the melt is shaped by extrusion through a nozzle.

19. The method of claim 18, wherein an amount of the melt is accumulated adjacent the nozzle and the accumulated amount of the melt is periodically extruded through the nozzle.

20. The method of claim 17, further comprising the steps of increasing the pressure on the melt between the plasticizing and extrusion steps, and extruding the melt at a constant conveying volume.

21. The method of claim 17, wherein the melt is shaped by injection molding.

22. The method of claim 17, comprising the further steps of mixing the plastic waste particles with water, heating the mixture of the particles to a temperature above 100° C. to evolve steam, removing the steam, compacting the mixture and further heating the compacted mixture to above 140° C. but below the processing temperature to evolve reaction gases and until the mixture has been partially homogenized, removing the reaction gases, further compacting the mixture while plasticizing the same at the processing temperature, and shaping the melt having the particles of impurities and non-plasticized plastic waste particles having a melting point above the melting point of the plastic material distributed therethrough and embedded therein.

23. The method of claim 17, further comprising the step of substantially uniformly distributing the particles of impurities and any plastic waste particles having a melting point above the processing temperature across the cross section of the melt being shaped.

24. The method of claim 17, further comprising the steps of dividing the melt into a plurality of substantially parallel streams and then combining the streams into a single stream before shaping the melt into a three-dimensional web.

25. The method of claim 24, further comprising the steps of calibrating the web and cooling the calibrated web.

26. The method of claim 24, further comprising the step of applying a cover layer to the three-dimensional web.

27. The method of claim 17, further comprising the step of inserting continuous filamentary reinforcing elements in the melt while shaping the same.

28. The method of claim 27, wherein the filamentary reinforcing elements are introduced in the direction of the movement.

29. The method of claim 27, wherein the filamentary reinforcing elements are introduced in a direction transverse to the movement.

30. The method of claim 17, further comprising the step of adding to the plastic waste particles a foaming agent releasing propellant gases upon being subjected to the processing temperature and the final pressure to obtain a foamed melt.

31. The method of claim 17, wherein the melt is extruded through a nozzle and the melt flows through the nozzle at a lower speed than adjacently thereto.

* * * * *